(12) United States Patent
Corder et al.

(10) Patent No.: US 8,424,335 B2
(45) Date of Patent: Apr. 23, 2013

(54) CASCADING SERIES OF THERMALLY INSULATED PASSIVE TEMPERATURE CONTROLLED CONTAINERS

(75) Inventors: Jacob Corder, Mound, MN (US); William T. Mayer, Stacy, MN (US)

(73) Assignee: Minnesota Thermal Science, LLC, Plymouth, MN (US)

( * ) Notice: Subject to any disclaimer, the term of this patent is extended or adjusted under 35 U.S.C. 154(b) by 263 days.

(21) Appl. No.: 12/640,230

(22) Filed: Dec. 17, 2009

(65) Prior Publication Data

US 2011/0147391 A1 Jun. 23, 2011

(51) Int. Cl.
F25D 3/08 (2006.01)

(52) U.S. Cl.
USPC ......... 62/371; 62/457.2; 229/103; 229/103.3; 229/103.11

(58) Field of Classification Search ............... 220/592.2, 220/4.28, 592.22–592.27; 229/103.11, 103.3, 229/103, 100; 62/371, 457.2; 428/34.1, 428/34.2
See application file for complete search history.

(56) References Cited

U.S. PATENT DOCUMENTS

| | | |
|---|---|---|
| 2,496,296 A | 2/1950 | Frederick |
| 3,077,426 A | 2/1963 | Jonston |
| 3,236,206 A | 2/1966 | Willinger |
| 3,262,283 A | 7/1966 | Taylor |
| 3,786,613 A | 1/1974 | Shepheard |
| 3,810,367 A | 5/1974 | Peterson |
| 3,974,658 A | 8/1976 | Starrett |
| 4,044,449 A | 8/1977 | Phan |
| 4,145,895 A | 3/1979 | Hjertstrand et al. |
| 4,147,004 A | 4/1979 | Day et al. |
| 4,319,629 A | 3/1982 | Hotta |
| 4,324,111 A | 4/1982 | Edwards |
| 4,527,370 A | 7/1985 | Schuette |
| 4,529,638 A | 7/1985 | Yamamoto et al. |
| 4,688,398 A | 8/1987 | Baek |
| 4,877,128 A | 10/1989 | Strickland |
| 4,892,226 A | 1/1990 | Abtahi |
| 4,923,007 A | 5/1990 | Sanford |
| 4,931,333 A | 6/1990 | Henry |
| 5,032,439 A | 7/1991 | Glicksman et al. |
| 5,050,387 A | 9/1991 | Bruce |
| 5,088,301 A | 2/1992 | Pipenbrink |
| 5,093,175 A | 3/1992 | Goto et al. |
| 5,435,142 A | 7/1995 | Silber |
| 5,562,228 A | 10/1996 | Erioson |
| 5,582,343 A | 12/1996 | Dalvey |
| 5,756,179 A | 5/1998 | Jutte |
| 5,758,513 A | 6/1998 | Smith |

(Continued)

FOREIGN PATENT DOCUMENTS

| | | |
|---|---|---|
| DE | 19915311 A1 | 10/2000 |
| DE | 10305550 A1 | 8/2004 |

(Continued)

Primary Examiner — Mickey Yu
Assistant Examiner — Kareen Rush
(74) Attorney, Agent, or Firm — Sherrill Law Offices, PLLC

(57) ABSTRACT

A modular collection of components from which a variety of thermally insulated and thermal controlled containers can be assembled. The collection includes at least two differently sized sleeves of thermal insulation, and at least two differently sized sleeves of phase change material that are nestable with one another to form various thermally insulated and thermally controlled containers with various combinations of available payload, target temperature, guaranteed duration of thermal control, size of container and weight of container.

18 Claims, 7 Drawing Sheets

U.S. PATENT DOCUMENTS

| | | | |
|---|---|---|---|
| 5,840,080 A | 11/1998 | Der Ovanesian | |
| 5,848,508 A | 12/1998 | Albrecht | |
| 5,875,599 A | 3/1999 | McGrath et al. | |
| 5,897,932 A | 4/1999 | McGarth et al. | |
| 5,899,088 A | 5/1999 | Purdum | |
| 5,924,302 A | 7/1999 | Derifield | |
| 5,979,693 A | 11/1999 | Bane, III | |
| 6,164,030 A | 12/2000 | Dietrich | |
| 6,168,040 B1 | 1/2001 | Sautner et al. | |
| 6,209,343 B1 | 4/2001 | Owen | |
| 6,223,551 B1 | 5/2001 | Mitchell | |
| 6,233,965 B1 | 5/2001 | Choy | |
| 6,244,458 B1 * | 6/2001 | Frysinger et al. | 220/592.09 |
| 6,250,104 B1 | 6/2001 | Bostic | |
| 6,266,972 B1 | 7/2001 | Bostic | |
| 6,325,281 B1 | 12/2001 | Grogan | |
| 6,457,323 B1 | 10/2002 | Marotta | |
| 6,474,095 B1 | 11/2002 | Chan | |
| 6,482,332 B1 * | 11/2002 | Malach | 252/70 |
| 6,502,417 B2 | 1/2003 | Gano, III | |
| 6,658,857 B1 | 12/2003 | George | |
| 6,718,776 B2 | 4/2004 | Wessling | |
| 6,761,041 B2 | 7/2004 | Roth et al. | |
| 7,147,626 B2 * | 12/2006 | Goodman et al. | 604/317 |
| 7,257,963 B2 * | 8/2007 | Mayer | 62/371 |
| 7,908,870 B2 * | 3/2011 | Williams et al. | 62/62 |
| 2002/0050147 A1 | 5/2002 | Mai | |
| 2002/0114937 A1 | 8/2002 | Albert et al. | |
| 2002/0134962 A1 | 9/2002 | Romero | |
| 2002/0144482 A1 | 10/2002 | Henson et al. | |
| 2004/0018335 A1 | 1/2004 | Best | |
| 2004/0025528 A1 | 2/2004 | Gano, III | |
| 2004/0074208 A1 | 4/2004 | Olson et al. | |
| 2004/0079793 A1 | 4/2004 | Mayer | |
| 2004/0079794 A1 | 4/2004 | Mayer | |
| 2004/0151851 A1 * | 8/2004 | Miller | 428/34.2 |
| 2004/0180176 A1 | 9/2004 | Rusek | |
| 2004/0231355 A1 | 11/2004 | Mayer | |
| 2005/0188714 A1 | 9/2005 | Wallace | |
| 2008/0099492 A1 | 5/2008 | Mayer | |

FOREIGN PATENT DOCUMENTS

| | | |
|---|---|---|
| DE | 202007007394 | 10/2007 |
| EP | 0157751 A2 | 10/1985 |
| EP | 1009646 A1 | 5/2002 |
| EP | 2022728 A1 | 11/2009 |
| WO | 9932374 | 7/1999 |
| WO | 2008137883 A1 | 11/2008 |

* cited by examiner

CASCADING SERIES OF THERMALLY INSULATED PASSIVE TEMPERATURE CONTROLLED CONTAINERS

BACKGROUND

Thermally labile goods, such as medical supplies, blood, vaccines and other biologics, must be kept within a tightly constrained temperature range during shipping and storage for extended periods of time. Significant advances in passively cooled shipping and transport containers have been made over the past few years by surrounding the payload retention chamber of the container with panels containing a phase change material. Such containers are described in U.S. Pat. Nos. 7,257,963, 7,422,143, 7,500,593, and 7,516,600.

While constituting a significant advance over prior thermal control containers, the cost of maintaining an inventory of such containers capable of providing the various combinations of available payload, target temperature, guaranteed duration of thermal control, size of container and weight of container desired from time to time by various users can be cost prohibitive.

Hence, a substantial need exists for passively cooled shipping and transport containers capable of allowing users to customize assembly of the shipping containers on site to achieve desired combinations of available payload, target temperature, guaranteed duration of thermal control, size of container and weight of container.

SUMMARY OF THE INVENTION

A first aspect of the present claimed invention is a cascading series of thermally insulated containers. A first embodiment of the first aspect includes (a) a first container having a first payload retention chamber defined and surrounded by separately deployable first nestable sleeves of thermal insulation and phase change material, and (b) a second container having a second payload retention chamber defined and surrounded by separately deployable second nestable sleeves of thermal insulation and phase change material, wherein the second container is nestable within the first container.

A second embodiment of the first aspect includes the same components as set forth above in connection with the first embodiment, with the second container nestable within the first sleeve of thermal insulation.

A third embodiment of the first aspect includes the same components as set forth above in connection with the first embodiment with the addition of an intermediate container having an intermediate payload retention chamber defined and surrounded by separately deployable intermediate sleeves of thermal insulation and phase change material, wherein the intermediate sleeve of thermal insulation is nestable within the first sleeve of thermal insulation (A), and wherein the entire second container is nestable within the intermediate sleeve of thermal insulation.

A second aspect of the present claimed invention is a modular collection of components from which a variety of thermally insulated containers can be assembled. The collection includes at least (i) three differently sized sleeves of thermal insulation including a smaller, a larger and an intermediate sized sleeve, and (ii) three differently sized sleeves of phase change material including a smaller, a larger and an intermediate sized sleeve. From these components, the following thermally insulated and thermal controlled containers can be assembled: (1) a smaller payload single insulated container formed by nesting together the smaller sleeve of thermal insulation and the smaller sleeve of a phase change material, (2) an intermediate sized payload single insulated container formed by nesting together the intermediate sized sleeve of thermal insulation and the intermediate sized sleeve of phase change material, (3) a larger payload single insulated container formed by nesting together the larger sleeve of thermal insulation and the larger sleeve of phase change material, and (4) at least one container with multiple layers of thermal insulation selected from (A) a smaller payload double insulated container formed by nesting together the intermediate sized sleeve of thermal insulation, the smaller sleeve of thermal insulation and the smaller sleeve of phase change material, (B) an intermediate sized payload double insulated container formed by nesting together the larger sleeve of thermal insulation, the intermediate sized sleeve of thermal insulation and the intermediate sized sleeve of phase change material, and (C) a smaller payload triple insulated container formed by nesting together the larger sleeve of thermal insulation, the intermediate sized sleeve of thermal insulation, the smaller sleeve of thermal insulation, and the smaller sleeve of phase change material.

DETAILED DESCRIPTION OF A PREFERRED EMBODIMENT

Nomenclature

Figure 1A:
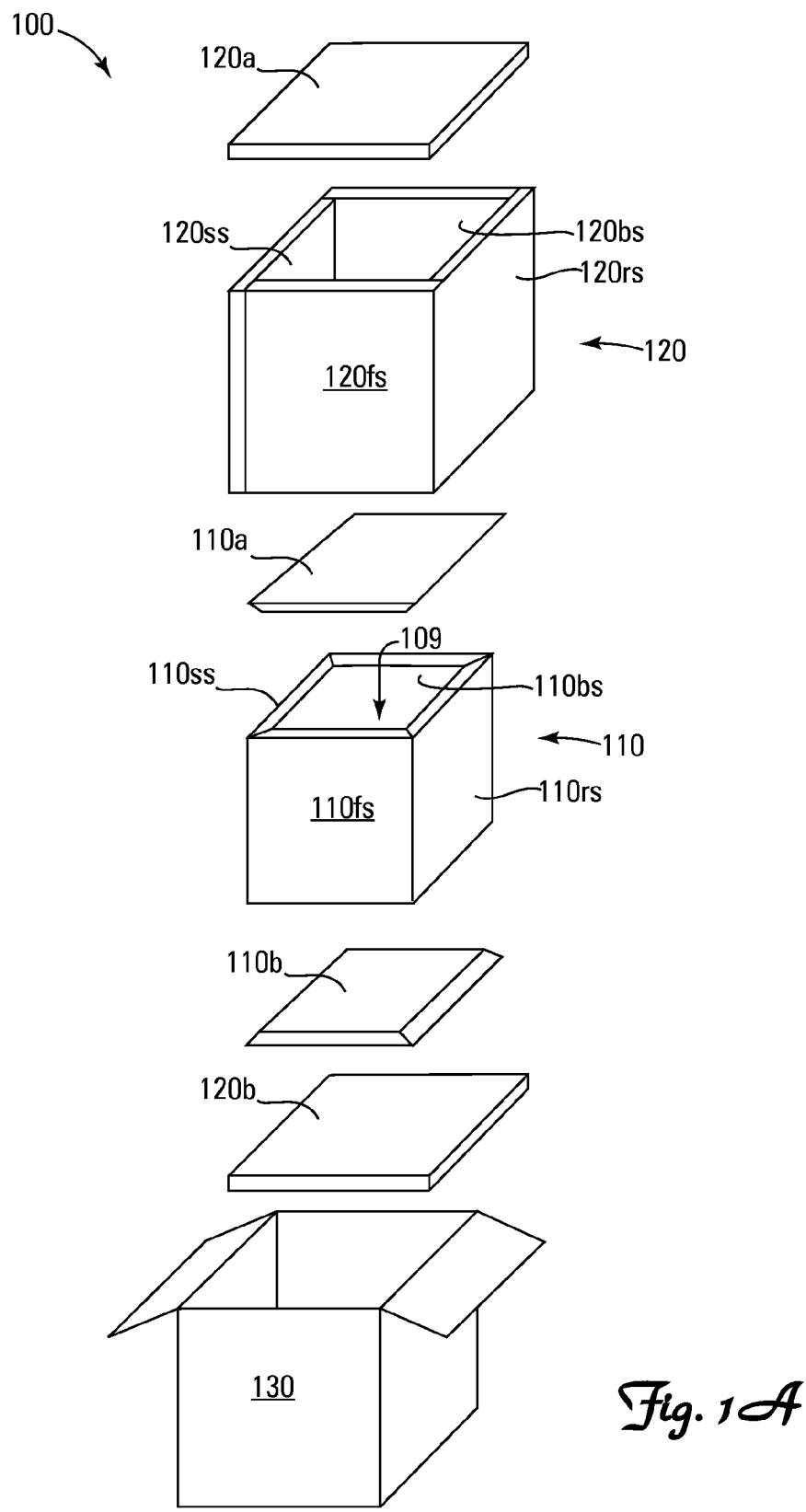
FIG. 1a is an exploded perspective view of one embodiment of a small, thermally insulated, passively cooled container of the present claimed invention.

100 Small Thermal Insulated Passively Cooled Container
109 Small Payload Retention Chamber
110 Small Sleeve of Phase Change Material
110a Small Top Phase Change Material-Containing Panel
110b Small Bottom Phase Change Material-Containing Panel
110rs Small Right Side Phase Change Material-Containing Panel
110ss Small Left Side Phase Change Material-Containing Panel
110fs Small Front Side Phase Change Material-Containing Panel
110bs Small Back Side Phase Change Material-Containing Panel
115 Phase Change Material in Small Panels
120 Small Sleeve of Thermal Insulation
120a Small Top Thermal Insulation Panel
120b Small Bottom Thermal Insulation Panel
120rs Small Right Side Thermal Insulation Panel
120ss Small Left Side Thermal Insulation Panel 120*fs* Small Front Side Thermal Insulation Panel
120*bs* Small Back Side Thermal Insulation Panel
130 Small Outer Shell
200 Intermediate Sized Thermal Insulated Passively Cooled Container
209 Intermediate Sized Payload Retention Chamber
210 Intermediate Sized Sleeve of Phase Change Material
210*a* Intermediate Sized Top Phase Change Material-Containing Panel
210*b* Intermediate Sized Bottom Phase Change Material-Containing Panel
210*rs* Intermediate Sized Right Side Phase Change Material-Containing Panel
210*ss* Intermediate Sized Left Side Phase Change Material-Containing Panel
210*fs* Intermediate Sized Front Side Phase Change Material-Containing Panel
210*bs* Intermediate Sized Back Side Phase Change Material-Containing Panel
215 Phase Change Material in Intermediate Sized Panels
220 Intermediate Sized Sleeve of Thermal Insulation
220*a* Intermediate Sized Top Thermal Insulation Panel
220*b* Intermediate Sized Bottom Thermal Insulation Panel
220*rs* Intermediate Sized Right Side Thermal Insulation Panel
220*ss* Intermediate Sized Left Side Thermal Insulation Panel
220*fs* Intermediate Sized Front Side Thermal Insulation Panel
220*bs* Intermediate Sized Back Side Thermal Insulation Panel
230 Intermediate Sized Outer Shell
300 Large Thermal Insulated Passively Cooled Container
309 Large Payload Retention Chamber
310 Large Sleeve of Phase Change Material
310*a* Large Top Phase Change Material-Containing Panel
310*b* Large Bottom Phase Change Material-Containing Panel
310*rs* Large Right Side Phase Change Material-Containing Panel
310*ss* Large Left Side Phase Change Material-Containing Panel
310*fs* Large Front Side Phase Change Material-Containing Panel
310*bs* Large Back Side Phase Change Material-Containing Panel
315 Phase Change Material in Large Panels
320 Large Sleeve of Thermal Insulation
320*a* Large Top Thermal Insulation Panel
320*b* Large Bottom Thermal Insulation Panel
320*rs* Large Right Side Thermal Insulation Panel
320*ss* Large Left Side Thermal Insulation Panel
320*fs* Large Front Side Thermal Insulation Panel
320*bs* Large Back Side Thermal Insulation Panel
330 Large Outer Shell
400 Small Payload, Double Insulated and Passively Cooled Container with Dual Layers of Phase Change Material
500 Small Payload Double Insulated and Passively Cooled Container
600 Intermediate Sized Payload Double Insulated and Passively Cooled Container
700 Small Payload Triple Insulated and Passively Cooled Container Definitions As utilized herein, including the claims, the term "nestable" means configured and arranged to compactly, but not necessarily precisely, fit one within another.

As utilized herein, including the claims, the phrase "phase change material" means a material capable of repeatedly changing states with a concomitant "absorption" of heat energy when melting and "release" of heat energy when freezing with virtually no change in the temperature of the material during the change of state.

As utilized herein, including the claims, the term "sleeve" means a hollow member with at least one open end and having any cross-sectional shape, including specifically but not exclusively, triangular, square, rectangular, pentagonal, hexagonal, heptagonal, octagonal and circular.

Figure 1B:
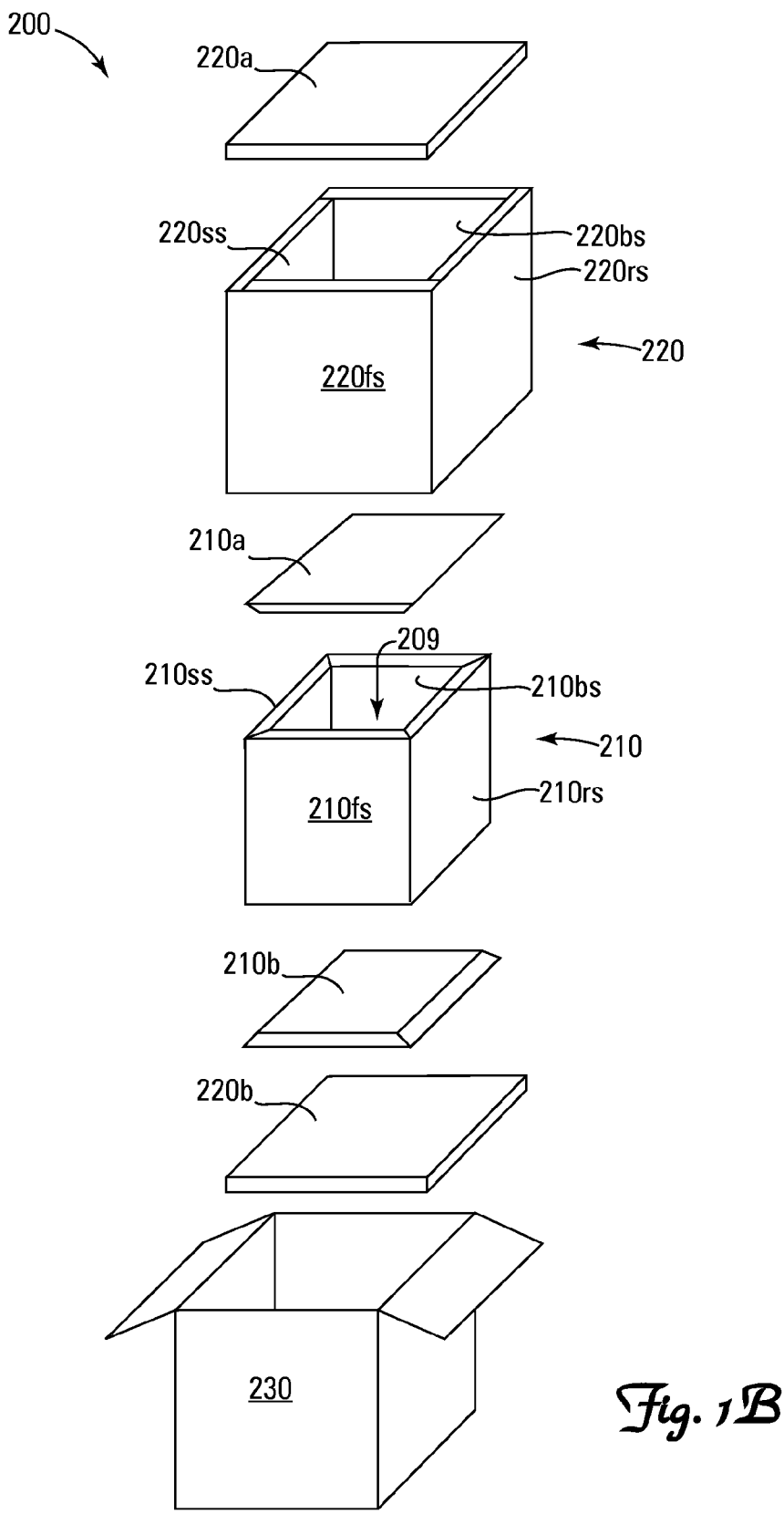
FIG. 1b is an exploded perspective view of one embodiment of an intermediate sized, thermally insulated, passively cooled container of the present claimed invention.
Figure 1C:
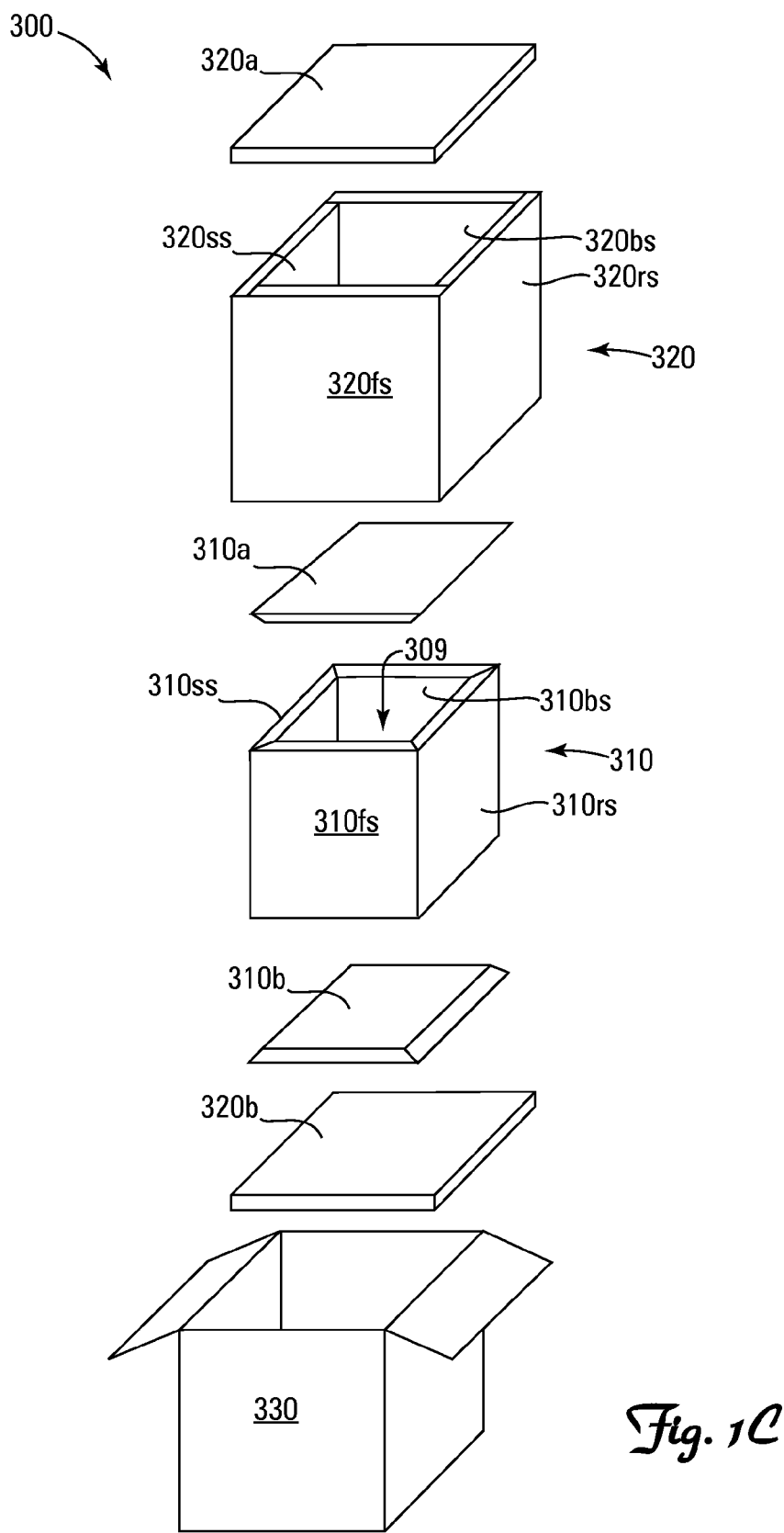
FIG. 1c is an exploded perspective view of one embodiment of a large, thermally insulated, passively cooled container of the present claimed invention.
Figure 2:
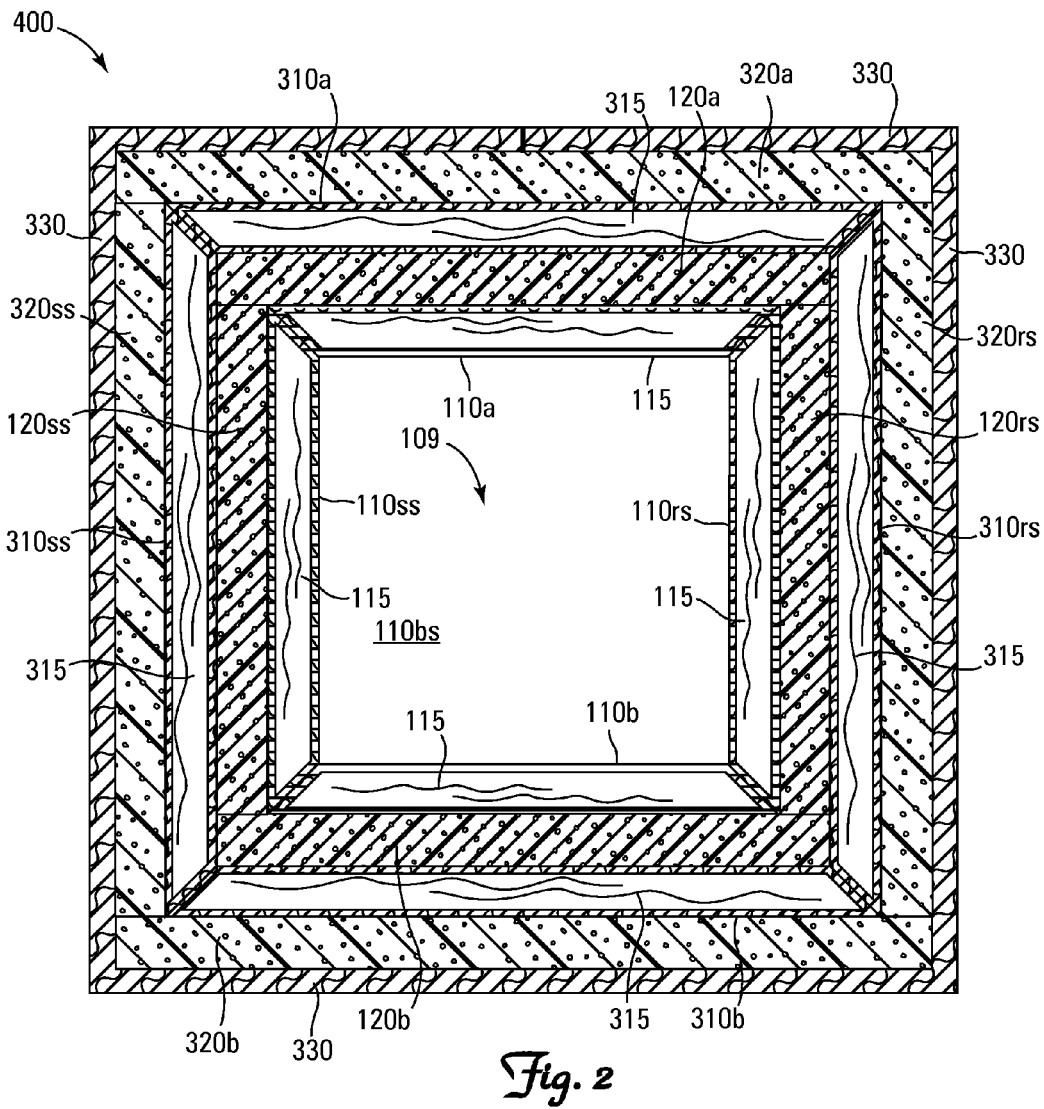
FIG. 2 is a cross-sectional side view of a small payload, double insulated and passively cooled container with dual layers of phase change material.
Figure 3:
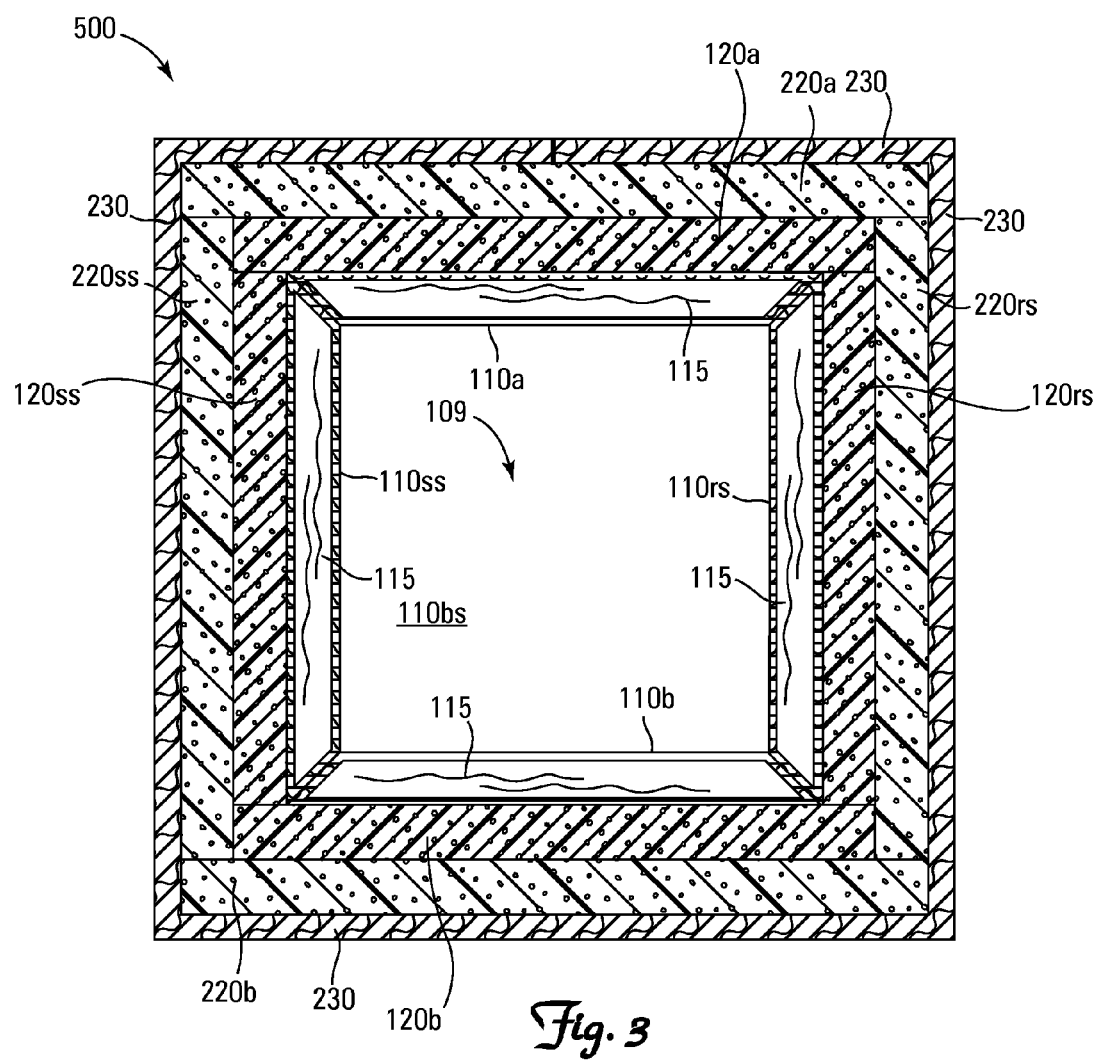
FIG. 3 is a cross-sectional side view of a small payload, double insulated and passively cooled container.
Figure 4:
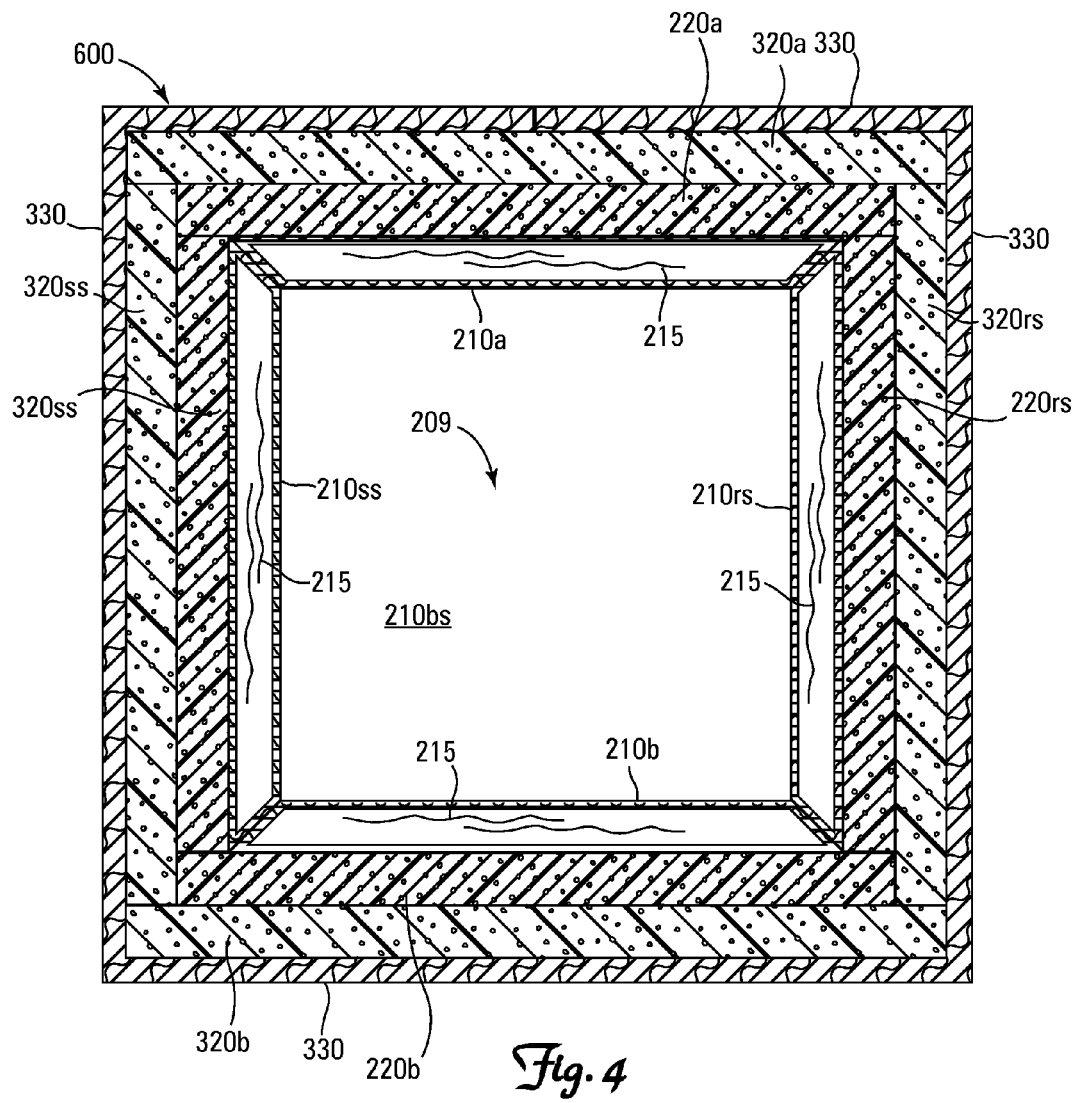
FIG. 4 is a cross-sectional side view of an intermediate sized payload, double insulated and passively cooled container.
Figure 5:
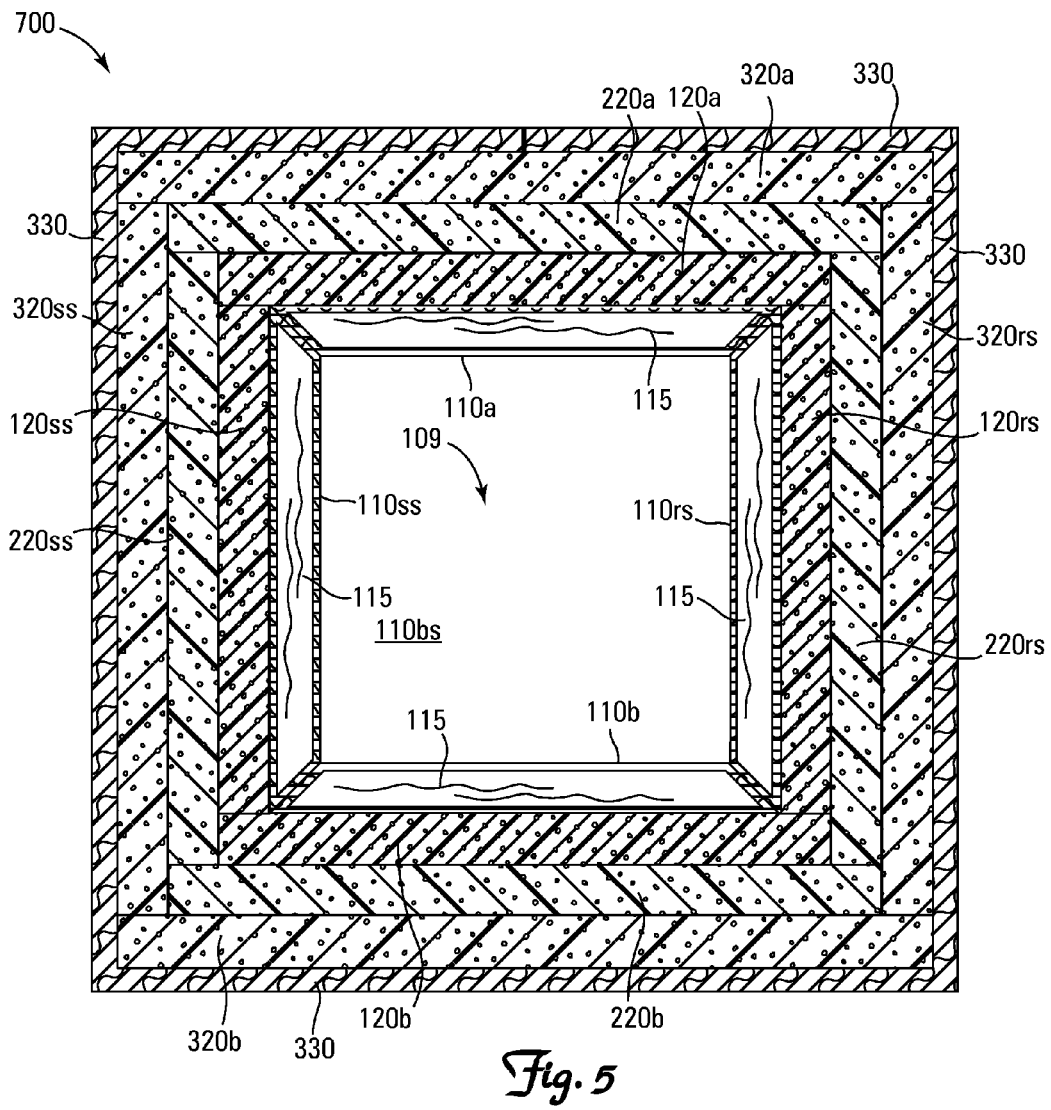
FIG. 5 is a cross-sectional side view of a small payload, triple insulated and passively cooled container.

The invention is directed to a cascading series of three thermally insulated containers that includes a smaller container 100 (FIG. 1A), optionally one or more intermediate sized containers 200 (FIG. 1B) and a larger container 300 (FIG. 1C), whose modular compatible components may be assembled to form the following variety of passively cooled and thermally insulated containers:

(A) a small, light, single insulated container 100, equipped with a single layer of phase change material 115 and providing a smaller payload retention chamber 109 (FIG. 1A) (hereinafter referenced as a Standard Small Payload Container or SSPC);

(B) an intermediate sized, medium weight, single insulated container 200, equipped with a single layer of phase change material 215 and providing an intermediate sized payload retention chamber 209 (FIG. 1B) (hereinafter referenced as a Standard Intermediate Sized Payload Container or SIPC);

(C) a large, heavy, single insulated container 300, equipped with a single layer of phase change material 315 and providing a larger payload retention chamber 309, (FIG. 1C) (hereinafter referenced as a Standard Large Payload Container or SLPC);

(D) a large, very heavy, double insulated container 400, equipped with dual layers of phase change material 115 and 315 and providing a smaller payload retention chamber 109 (FIG. 2) (hereinafter referenced as a Dual Insulated Dual PCM Small Payload Container or 2-2-SPC);

(E) an intermediate sized, light, double insulated container 500, equipped with a single layer of phase change material 115 and providing a smaller payload retention chamber 109 (FIG. 3) (hereinafter referenced as a Dual Insulated Small Payload Container or 2-1-SPC);

(F) a large, medium weight, double insulated container 600, equipped with a single layer of phase change material 215 and providing an intermediate sized payload retention chamber 209 (FIG. 4) (hereinafter referenced as a Dual Insulated Intermediate Sized Payload Container or 2-1-IPC): and (G) a large, light, triple insulated container 700, equipped with a single layer of phase change material 115 and providing a small sized payload retention chamber 109 (FIG. 5) (hereinafter referenced as a Triple Insulated Small Payload Container or 3-1-SPC); and Each of the standard containers 100, 200, 300 include (i) a sleeve 110, 210, 310 of phase change material 115, 215, 315, (ii) a sleeve of thermal insulation 120, 220, 320, and (iii) an outer protective shipping carton 130, 230, 330.

With the foregoing structure, thermal flux enters through the outer protective shipping carton 130, 230, 330, is attenuated by the sleeve(s) of thermal insulation 120, 220, 320, and is "absorbed" by the phase change material 115, 215, 315 where the thermal energy is used to effect a phase change of the phase change material 115, 215, 315 from a solid into a liquid at the melting point of the solid. For example, when water is employed as the phase change material 115, 215, 315 the temperature of the payload retention chamber 109, 209, 309 will remain at 0° C. (the melting point for ice) until all of the ice is convert to water, with 144 Btu's "absorbed" per pound of ice to effect the phase change.

The sleeves 110, 210, 310 of phase change material 115, 215, 315 each include (–) a top panel 110a, 210a, 310a, (–) a bottom panel 110b, 210b, 310b, (–) a right side panel 110rs, 210rs, 310rs, (–) a left side panel 110ss, 210ss, 310ss, (–) a front side panel 110fs, 210fs, 310fs, and (–) a back side panel 110bs, 210bs, 310bs. In order to provide access to the payload retention chamber 109, 209, 309 formed by the phase change panels 110, 210, 310, the top panel 110a, 210a, 310a is formed separately from the other panels. The other panels (i.e., bottom, right side, left side, front side and back side) may be formed as separate panels with each panel having a reservoir (unnumbered) for retaining phase change material 115, 215, 315, or they may be integrated together as a single unitary unit with a single reservoir (unnumbered) for retaining phase change material 115, 215, 315.

Based upon thermal capacity, it is generally preferred to use materials that freeze and melt (i.e., change between solid and liquid) rather than those that vaporize, condense or sublimate (i.e., change between liquid and gas, or solid and gas) at the target temperature. Due to its low cost and ready availability, water is generally preferred. However, other materials having different melting points may be used when the target temperature is above or below the 0° C. melting/freezing point of water. For example, deuterium oxide ($D_2O$), having a melting/freezing point of 3.6° C., or paraffin wax, having a melting/freezing point of between 47° C. and 64° C. Furthermore, other materials, such as salts or antifreeze, maybe mixed with water to provide a PCM having a controllable but different melting point.

The sleeves of thermal insulation 120, 220, 320 each include (–) a top panel 120a, 220a, 320a, (–) a bottom panel 120b, 220b, 320b, (–) aright side panel 120rs, 220rs, 320rs, (–) a left side panel 120ss, 220ss, 320ss, (–) a front side panel 120fs, 220fs, 320fs, and (–) a back side panel 120bs, 220bs, 320bs. In order to provide access to the payload retention chamber 109, 209, 309, the top panel 120a, 220a, 320a is formed separately from the other panels. The other panels (i.e., bottom, right side, left side, front side and back side) may be formed as separate panels or they may be formed as a single unitary unit.

Suitable thermal insulation materials include any material capable of reducing the rate of heat transfer and having an R-value per inch of at least 3. Preferred thermal insulating materials are those having an R-value per inch of at least 5, preferably at least 7. Due to their lightweight nature and high R value, vacuum insulated panels or VIPs are particularly well suited for use in the present invention.

The outer protective shipping carton 130, 230, 330 may be formed from any material capable of providing the desired structural integrity, such as paperboard, cardboard, fabric, wood, plastic, aluminum, steel, etc. Based predominantly upon an excellent balancing of protection afforded by the material and cost, the preferred material is cardboard.

Exemplary sizes for each of the sleeves 110, 210, 310 of phase change material 115, 215, 315, sleeves of thermal insulation 120, 220, 320, and outer protective shipping cartons 130, 230, 330 effective for providing the nestability required to allow assembly of the various containers 100, 200, 300, 400, 500, 600 and 700, are set forth below in Tables One, Two and Three, with the containers listed in Table One intended to be carried by hand over long distances for an extended period of time (e.g., transported several miles by an EMT on foot into a remote location), containers listed in Table Two intended to be carried by hand over short distances for a short period of time (e.g., carried by hand several hundred yards from a delivery truck to a medical facility), and containers listed in Table Three intended only for mechanized transport (e.g., transported via a forklift from a delivery truck to a medical facility). The designation "+" indicates slightly larger (e.g. $\frac{1}{10}^{th}$ of an inch) for accommodating nesting, while "−" indicates slightly smaller (e.g. $\frac{1}{10}^{th}$ of an inch) for accommodating nesting. The dimensional aspects of height, length and width are based upon an assembled container, while thickness is based upon each individual component.

TABLE ONE

Personal Container

| Component | | Dimensions | | | |
|---|---|---|---|---|---|
| | | Height (Inches) | Length (Inches) | Width (Inches) | Thickness (Inches) |
| SSPC 100 | | | | | |
| Payload Retention Chamber | 109 | 5 | 6 | 6 | |
| Phase Change Material (PCM) Assembled Sleeve 110 (Formed from Panels with 45° Angled Edges) | | | | | |
| Inside Dimensions | | 5 | 6 | 6 | |
| Outside Dimensions | | 6½ | 7½ | 7½ | |
| Small Top PCM Panel | 110a | — | 7½ | 7½ | ¾ |
| Small Bottom PCM Panel | 110b | — | 7½ | 7½ | ¾ |
| Small Right Side PCM Panel | 110rs | 6½ | — | 7½ | ¾ |
| Small Left Side PCM Panel | 110ss | 6½ | — | 7½ | ¾ |
| Small Front Side PCM Panel | 110fs | 6½ | 7½ | — | ¾ |
| Small Back Side PCM Panel | 110bs | 6½ | 7½ | — | ¾ |
| Thermal Insulation (TI) Assembled Sleeve 120 (Formed from Right Cuboidal Panels) | | | | | |
| Inside Dimensions | | 6¾ | 7¾ | 7¾ | |
| Outside Dimensions | | 9¾ | 10¾ | 10¾ | |
| Small Top TI Panel | 120a | — | 10¾ | 10¾ | 1½ |
| Small Bottom TI Panel | 120b | — | 10¾ | 10¾ | 1½ |
| Small Right Side TI Panel | 120rs | 6¾ | — | 9¼ | 1½ |
| Small Left Side TI Panel | 120ss | 6¾ | — | 9¼ | 1½ |
| Small Front Side TI Panel | 120fs | 6¾ | 9¼ | — | 1½ |
| Small Back Side TI Panel | 120bs | 6¾ | 9¼ | — | 1½ |
| Outer Shell 130 | | | | | |
| Inside Dimensions | | 9¾ | 10¾ | 10¾ | |
| Outside Dimensions | | 10¼ | 11¼ | 11¼ | |
| SIPC 200 | | | | | |
| Payload Retention Chamber | 209 | 8¼ | 9¼ | 9¼ | |
| Phase Change Material (PCM) Assembled Sleeve 210 (Formed from Panels with 45° Angled Edges) | | | | | |
| Inside Dimensions | | 8¼ | 9¼ | 9¼ | |
| Outside Dimensions | | 9¾ | 10¾ | 10¾ | |
| Medium Top PCM Panel | 210a | — | 10¾ | 10¾ | ¾ |
| Medium Bottom PCM Panel | 210b | — | 10¾ | 10¾ | ¾ |
| Medium Right Side PCM Panel | 210rs | 9¾ | — | 10¾ | ¾ |
| Medium Left Side PCM Panel | 210ss | 9¾ | — | 10¾ | ¾ |

TABLE ONE-continued

Personal Container

| Component | | Height (Inches) | Length (Inches) | Width (Inches) | Thickness (Inches) |
|---|---|---|---|---|---|
| Medium Front Side PCM Panel | 210fs | 9¾ | 10¾ | — | ¾ |
| Medium Back Side PCM Panel | 210bs | 9¾ | 10¾ | — | ¾ |
| Thermal Insulation (TI) Assembled Sleeve 220 (Formed from Right Cuboidal Panels) | | | | | |
| Inside Dimensions | | 10 | 11 | 11 | |
| Outside Dimensions | | 13 | 14 | 14 | |
| Medium Top TI Panel | 220a | — | 14 | 14 | 1½ |
| Medium Bottom TI Panel | 220b | — | 14 | 14 | 1½ |
| Medium Right Side TI Panel | 220rs | 10 | — | 12½ | 1½ |
| Medium Left Side TI Panel | 220ss | 10 | — | 12½ | 1½ |
| Medium Front Side TI Panel | 220fs | 10 | 12½ | — | 1½ |
| Medium Back Side TI Panel | 220bs | 10 | 12½ | — | 1½ |
| Outer Shell 230 | | | | | |
| Inside Dimensions | | 13 | 14 | 14 | |
| Outside Dimensions | | 13½ | 14½ | 14½ | |
| SLPC 300 | | | | | |
| Payload Retention Chamber | 309 | 10 | 11 | 11 | |
| Phase Change Material (PCM) Assembled Sleeve 310 (Formed from Panels with 45° Angled Edges) | | | | | |
| Inside Dimensions | | 10 | 11 | 11 | |
| Outside Dimensions | | 13 | 14 | 14 | |
| Large Top PCM Panel | 310a | — | 14 | 14 | 1½ |
| Large Bottom PCM Panel | 310b | — | 14 | 14 | 1½ |
| Large Right Side PCM Panel | 310rs | 13 | — | 14 | 1½ |
| Large Left Side PCM Panel | 310ss | 13 | — | 14 | 1½ |
| Large Front Side PCM Panel | 310fs | 13 | 14 | — | 1½ |
| Large Back Side PCM Panel | 310bs | 13 | 14 | — | 1½ |
| Thermal Insulation (TI) Assembled Sleeve 320 (Formed from Right Cuboidal Panels) | | | | | |
| Inside Dimensions | | 13¼ | 14¼ | 14¼ | |
| Outside Dimensions | | 16¼ | 17¼ | 17¼ | |
| Large Top TI Panel | 320a | — | 17¼ | 17¼ | 1½ |
| Large Bottom TI Panel | 320b | — | 17¼ | 17¼ | 1½ |
| Large Right Side TI Panel | 320rs | 13¼ | — | 15¾ | 1½ |
| Large Left Side TI Panel | 320ss | 13¼ | — | 15¾ | 1½ |
| Large Front Side TI Panel | 320fs | 13¼ | 15¾ | — | 1½ |
| Large Back Side TI Panel | 320bs | 13¼ | 15¾ | — | 1½ |
| Outer Shell 330 | | | | | |
| Inside Dimensions | | 16¼ | 17¼ | 17¼ | |
| Outside Dimensions | | 16¾ | 17¾ | 17¾ | |

TABLE TWO

Portable Container

| Component | | Height (Inches) | Length (Inches) | Width (Inches) | Thickness (Inches) |
|---|---|---|---|---|---|
| SSPC 100 | | | | | |
| Payload Retention Chamber | 109 | 8 | 10 | 12 | |
| Phase Change Material (PCM) Assembled Sleeve 110 (Formed from Panels with 45° Angled Edges) | | | | | |
| Inside Dimensions | | 8 | 10 | 12 | |
| Outside Dimensions | | 10⁻ | 12⁻ | 14⁻ | |
| Small Top PCM Panel | 110a | — | 12⁻ | 14⁻ | 1⁻ |
| Small Bottom PCM Panel | 110b | — | 12⁻ | 14⁻ | 1⁻ |
| Small Right Side PCM Panel | 110rs | 10⁻ | — | 14⁻ | 1⁻ |
| Small Left Side PCM Panel | 110ss | 10⁻ | — | 14⁻ | 1⁻ |
| Small Front Side PCM Panel | 110fs | 10⁻ | 12⁻ | — | 1⁻ |
| Small Back Side PCM Panel | 110bs | 10⁻ | 12⁻ | — | 1⁻ |
| Thermal Insulation (TI) Assembled Sleeve 120 (Formed from Right Cuboidal Panels) | | | | | |
| Inside Dimensions | | 10⁺ | 12⁺ | 14⁺ | |
| Outside Dimensions | | 13⁻ | 15⁻ | 17⁻ | |
| Small Top TI Panel | 120a | — | 15⁻ | 17⁻ | 1½⁻ |
| Small Bottom TI Panel | 120b | — | 15⁻ | 17⁻ | 1½⁻ |
| Small Right Side TI Panel | 120rs | 10⁺ | — | 15½⁻ | 1½⁻ |
| Small Left Side TI Panel | 120ss | 10⁺ | — | 15½⁻ | 1½⁻ |
| Small Front Side TI Panel | 120fs | 10⁺ | 13½⁻ | — | 1½⁻ |
| Small Back Side TI Panel | 120bs | 10⁺ | 13½⁻ | — | 1½⁻ |

TABLE TWO-continued

| Portable Container | | | | |
|---|---|---|---|---|
| | | Dimensions | | |
| Component | Height (Inches) | Length (Inches) | Width (Inches) | Thickness (Inches) |
| Outer Shell 130 | | | | |
| Inside Dimensions | 13 | 15 | 17 | — |
| Outside Dimensions | 13½ | 15½ | 17½ | — |
| SIPC 200 | | | | |
| Payload Retention Chamber 209 | 11 | 13 | 15 | |
| Phase Change Material (PCM) Assembled Sleeve 210 (Formed from Panels with 45° Angled Edges) | | | | |
| Inside Dimensions | | 11 | 13 | 15 |
| Outside Dimensions | | 13⁻ | 15⁻ | 17⁻ |
| Medium Top PCM Panel 210a | — | 15⁻ | 17⁻ | 1⁻ |
| Medium Bottom PCM Panel 210b | — | 15⁻ | 17⁻ | 1⁻ |
| Medium Right Side PCM Panel 210rs | 13⁻ | — | 17⁻ | 1⁻ |
| Medium Left Side PCM Panel 210ss | 13⁻ | — | 17⁻ | 1⁻ |
| Medium Front Side PCM Panel 210fs | 13⁻ | 15⁻ | — | 1⁻ |
| Medium Back Side PCM Panel 210bs | 13⁻ | 15⁻ | — | 1⁻ |
| Thermal Insulation (TI) Assembled Sleeve 220 (Formed from Right Cuboidal Panels) | | | | |
| Inside Dimensions | | 13⁺ | 15⁺ | 17⁺ |
| Outside Dimensions | | 16⁻ | 18⁻ | 20⁻ |
| Medium Top TI Panel 220a | — | 18⁻ | 20⁻ | 1½⁻ |
| Medium Bottom TI Panel 220b | — | 18⁻ | 20⁻ | 1½⁻ |
| Medium Right Side TI Panel 220rs | 13⁺ | — | 18½⁻ | 1½⁻ |
| Medium Left Side TI Panel 220ss | 13⁺ | — | 18½⁻ | 1½⁻ |
| Medium Front Side TI Panel 220fs | 13⁺ | 16½⁻ | — | 1½⁻ |
| Medium Back Side TI Panel 220bs | 13⁺ | 16½⁻ | — | 1½⁻ |
| Outer Shell 230 | | | | |
| Inside Dimensions | | 16 | 18 | 20 |
| Outside Dimensions | | 16½ | 18½ | 20½ |
| SLPC 300 | | | | |
| Payload Retention Chamber 309 | 13⁺ | 15⁺ | 17⁺ | |
| Phase Change Material (PCM) Assembled Sleeve 310 (Formed from Panels with 45° Angled Edges) | | | | |
| Inside Dimensions | | 13⁺ | 15⁺ | 17⁺ |
| Outside Dimensions | | 16⁻ | 18⁻ | 20⁻ |
| Large Top PCM Panel 310a | — | 18⁻ | 20⁻ | 1½⁻ |
| Large Bottom PCM Panel 310b | — | 18⁻ | 20⁻ | 1½⁻ |
| Large Right Side PCM Panel 310rs | 16⁻ | — | 20⁻ | 1½⁻ |
| Large Left Side PCM Panel 310ss | 16⁻ | — | 20⁻ | 1½⁻ |
| Large Front Side PCM Panel 310fs | 16⁻ | 18⁻ | — | 1½⁻ |
| Large Back Side PCM Panel 310bs | 16⁻ | 18⁻ | — | 1½⁻ |
| Thermal Insulation (TI) Assembled Sleeve 320 (Formed from Right Cuboidal Panels) | | | | |
| Inside Dimensions | | 16⁺ | 18⁺ | 20⁺ |
| Outside Dimensions | | 19⁻ | 21⁻ | 23⁻ |
| Large Top TI Panel 320a | — | 21⁻ | 23⁻ | 1½⁻ |
| Large Bottom TI Panel 320b | — | 21⁻ | 23⁻ | 1½⁻ |
| Large Right Side TI Panel 320rs | 16⁺ | — | 21½⁻ | 1½⁻ |
| Large Left Side TI Panel 320ss | 16⁺ | — | 21½⁻ | 1½⁻ |
| Large Front Side TI Panel 320fs | 16⁺ | 19½⁻ | — | 1½⁻ |
| Large Back Side TI Panel 320bs | 16⁺ | 19½⁻ | — | 1½⁻ |
| Outer Shell 330 | | | | |
| Inside Dimensions | | 19 | 21 | 23 |
| Outside Dimensions | | 19½ | 21½ | 23½ |

TABLE THREE

| | | Shipping Container Dimension | | |
|---|---|---|---|---|
| Component | Height (Inches) | Length (Inches) | Width (Inches) | Thickness (Inches) |
| SSPC 100 | | | | |
| Payload Retention Chamber 109 | 32 | 44 | 44 | |
| *Phase Change Material (PCM) Assembled Sleeve 110* | | | | |
| *(Formed from Panels with 45° Angled Edges)* | | | | |
| Inside Dimensions | 32 | 44 | 44 | |
| Outside Dimensions | 36⁻ | 48⁻ | 48⁻ | |
| Small Top PCM Panel 110a | — | 48⁻ | 48⁻ | 2⁻ |
| Small Bottom PCM Panel 110b | — | 48⁻ | 48⁻ | 2⁻ |
| Small Right Side PCM Panel 110rs | 36⁻ | — | 48⁻ | 2⁻ |
| Small Left Side PCM Panel 110ss | 36⁻ | — | 48⁻ | 2⁻ |
| Small Front Side PCM Panel 110fs | 36⁻ | 48⁻ | — | 2⁻ |
| Small Back Side PCM Panel 110bs | 36⁻ | 48⁻ | — | 2⁻ |
| *Thermal Insulation (TI) Assembled Sleeve 120* | | | | |
| *(Formed from Right Cuboidal Panels)* | | | | |
| Inside Dimensions | 36⁺ | 48⁺ | 48⁺ | |
| Outside Dimensions | 40⁻ | 52⁻ | 52⁻ | |
| Small Top TI Panel 120a | — | 52⁻ | 52⁻ | 2⁻ |
| Small Bottom TI Panel 120b | — | 52⁻ | 52⁻ | 2⁻ |
| Small Right Side TI Panel 120rs | 36⁺ | — | 50⁻ | 2⁻ |
| Small Left Side TI Panel 120ss | 36⁺ | — | 50⁻ | 2⁻ |
| Small Front Side TI Panel 120fs | 36⁺ | 50⁻ | — | 2⁻ |
| Small Back Side TI Panel 120bs | 36⁺ | 50⁻ | — | 2⁻ |
| *Outer Shell 130* | | | | |
| Inside Dimensions | 40 | 52 | 52 | — |
| Outside Dimensions | 40½ | 52½ | 52½ | — |
| SIPC 200 | | | | |
| Payload Retention Chamber 209 | 36 | 48 | 48 | |
| *Phase Change Material (PCM) Assembled Sleeve 210* | | | | |
| *(Formed from Panels with 45° Angled Edges)* | | | | |
| Inside Dimensions | 36 | 48 | 48 | |
| Outside Dimensions | 40⁻ | 52⁻ | 52⁻ | |
| Medium Top PCM Panel 210a | — | 52⁻ | 52⁻ | 2⁻ |
| Medium Bottom PCM Panel 210b | — | 52⁻ | 52⁻ | 2⁻ |
| Medium Right Side PCM Panel 210rs | 40⁻ | — | 52⁻ | 2⁻ |
| Medium Left Side PCM Panel 210ss | 40⁻ | — | 52⁻ | 2⁻ |
| Medium Front Side PCM Panel 210fs | 40⁻ | 52⁻ | — | 2⁻ |
| Medium Back Side PCM Panel 210bs | 40⁻ | 52⁻ | — | 2⁻ |
| *Thermal Insulation (TI) Assembled Sleeve 220* | | | | |
| *(Formed from Right Cuboidal Panels)* | | | | |
| Inside Dimensions | 40⁺ | 52⁺ | 52⁺ | |
| Outside Dimensions | 44⁻ | 56⁻ | 56⁻ | |
| Medium Top TI Panel 220a | — | 56⁻ | 56⁻ | 2⁻ |
| Medium Bottom TI Panel 220b | — | 56⁻ | 56⁻ | 2⁻ |
| Medium Right Side TI Panel 220rs | 40⁺ | — | 54⁻ | 2⁻ |
| Medium Left Side TI Panel 220ss | 40⁺ | — | 54⁻ | 2⁻ |
| Medium Front Side TI Panel 220fs | 40⁺ | 54⁻ | — | 2⁻ |
| Medium Back Side TI Panel 220bs | 40⁺ | 54⁻ | — | 2⁻ |
| *Outer Shell 230* | | | | |
| Inside Dimensions | 44 | 56 | 56 | |
| Outside Dimensions | 44½ | 56½ | 56½ | |
| SLPC 300 | | | | |
| Payload Retention Chamber 309 | 40⁺ | 52⁺ | 52⁺ | |
| *Phase Change Material (PCM) Assembled Sleeve 310* | | | | |
| *(Formed from Panels with 45° Angled Edges)* | | | | |
| Inside Dimensions | 40⁺ | 52⁺ | 52⁺ | |
| Outside Dimensions | 44⁻ | 56⁻ | 56⁻ | |
| Large Top PCM Panel 310a | — | 56⁻ | 56⁻ | 2⁻ |
| Large Bottom PCM Panel 310b | — | 56⁻ | 56⁻ | 2⁻ |
| Large Right Side PCM Panel 310rs | 44⁻ | — | 56⁻ | 2⁻ |
| Large Left Side PCM Panel 310ss | 44⁻ | — | 56⁻ | 2⁻ |
| Large Front Side PCM Panel 310fs | 44⁻ | 56⁻ | — | 2⁻ |
| Large Back Side PCM Panel 310bs | 44⁻ | 56⁻ | — | 2⁻ |

TABLE THREE-continued

Shipping Container

| Component | Dimension | | | |
|---|---|---|---|---|
| | Height (Inches) | Length (Inches) | Width (Inches) | Thickness (Inches) |
| Thermal Insulation (TI) Assembled Sleeve 320 (Formed from Right Cuboidal Panels) | | | | |
| Inside Dimensions | 44+ | 56+ | 56+ | |
| Outside Dimensions | 48− | 60− | 60− | |
| Large Top TI Panel | 320a — | 60− | 60− | 2− |
| Large Bottom TI Panel | 320b — | 60− | 60− | 2− |
| Large Right Side TI Panel | 320rs 44+ | — | 58− | 2− |
| Large Left Side TI Panel | 320ss 44+ | — | 58− | 2− |
| Large Front Side TI Panel | 320fs 44+ | 58− | — | 2− |
| Large Back Side TI Panel | 320bs 44+ | 58− | — | 2− |
| Outer Shell 330 | | | | |
| Inside Dimensions | 48 | 60 | 60 | |
| Outside Dimensions | 48½ | 60½ | 60½ | |

Spacers (not shown) such as ¼ inch or ½ inch thick cardboard panels may be inserted between layers as desired to fill any gaps that may occur due to size variances resulting from manufacturing tolerances or wear.

The thermal efficiency of the containers 100, 200, 300, 400, 500, 600, 700 is best when the containers are shaped as a cube, but their shape is not limited to a cube.

We claim:

1. A cascading series of thermally insulated containers, comprising:
   (a) a first container having a first payload retention chamber defined and surrounded by separately deployable first nestable sleeves of thermal insulation and phase change material, and
   (b) a second container having a second payload retention chamber defined and surrounded by separately deployable second nestable sleeves of thermal insulation and phase change material,
   (c) wherein the phase change materials surrounding the first and second containers are the same material, and the second container is nestable within the first container.

2. The cascading series of thermally insulated containers of claim 1 wherein each of the first and second sleeves of thermal insulation have a bottom end enclosed with an integrated layer of thermal insulation.

3. The cascading series of thermally insulated containers of claim 1 wherein the thermal insulation is vacuum insulated panels.

4. The cascading series of thermally insulated containers of claim 1 wherein the phase change material is water.

5. A cascading series of thermally insulated containers, comprising:
   (a) a first container having a first payload retention chamber defined and surrounded by separately deployable first nestable sleeves of thermal insulation and phase change material, and
   (b) a second container having a second payload retention chamber defined and surrounded by separately deployable second nestable sleeves of thermal insulation and phase change material,
   (c) wherein the phase change materials surrounding the first and second containers are the same material, and second container is nestable within the first sleeve of thermal insulation.

6. The cascading series of thermally insulated containers of claim 5 wherein each of the first and second sleeves of thermal insulation have a bottom end enclosed with an integrated layer of thermal insulation.

7. The cascading series of thermally insulated containers of claim 5 wherein the thermal insulation is vacuum insulated panels.

8. The cascading series of thermally insulated containers of claim 5 wherein the phase change material is water.

9. A cascading series of thermally insulated containers, comprising:
   (a) a first container having a first payload retention chamber defined and surrounded by separately deployable first sleeves of thermal insulation and phase change material,
   (b) an intermediate container having an intermediate payload retention chamber defined and surrounded by separately deployable intermediate sleeves of thermal insulation and phase change material, wherein the intermediate sleeve of thermal insulation is nestable within the first sleeve of thermal insulation, and
   (c) a second container having a second payload retention chamber defined and surrounded by separately deployable second sleeves of thermal insulation and phase change material, wherein the phase change materials surrounding the first, intermediate and second containers are the same material, and the entire second container is nestable within the intermediate sleeve of thermal insulation.

10. The cascading series of thermally insulated containers of claim 9 wherein each of the first, second and intermediate sleeves of thermal insulation have a bottom end enclosed with an integrated layer of thermal insulation.

11. The cascading series of thermally insulated containers of claim 9, wherein the entire second container is nestable within the first container.

12. The cascading series of thermally insulated containers of claim 9 wherein the thermal insulation is vacuum insulated panels.

13. The cascading series of thermally insulated containers of claim 9 wherein the phase change material is water.

14. A modular collection of components comprising at least:
   (a) three differently sized sleeves of thermal insulation including a smaller, a larger and an intermediate sized sleeve, and (b) three differently sized sleeves of phase change material including a smaller, a larger and an intermediate sized sleeve all containing the same phase change material, (c) from which at least the following thermally insulated containers can be assembled:
  (1) a smaller payload single insulated container formed by nesting together the smaller sleeve of thermal insulation and the smaller sleeve of a phase change material,
  (2) an intermediate sized payload single insulated container formed by nesting together the intermediate sized sleeve of thermal insulation and the intermediate sized sleeve of phase change material,
  (3) a larger payload single insulated container formed by nesting together the larger sleeve of thermal insulation and the larger sleeve of phase change material, and
  (4) at least one of:
    (A) a smaller payload double insulated container formed by nesting together the intermediate sized sleeve of thermal insulation, the smaller sleeve of thermal insulation and the smaller sleeve of phase change material,
    (B) an intermediate sized payload double insulated container formed by nesting together the larger sleeve of thermal insulation, the intermediate sized sleeve of thermal insulation and the intermediate sized sleeve of phase change material, and
    (C) a smaller payload triple insulated container formed by nesting together the larger sleeve of thermal insulation, the intermediate sized sleeve of thermal insulation, the smaller sleeve of thermal insulation, and the smaller sleeve of phase change material.

15. The modular collection of claim 14 wherein each of the smaller, intermediate sized and larger sleeves of thermal insulation have a bottom end enclosed with an integrated layer of thermal insulation.

16. The modular collection of claim 14 wherein the larger sleeve of thermal insulation, larger sleeve of a phase change material, smaller sleeve of thermal insulation and smaller sleeve of phase change material can be nested together to form a double insulated container with dual layers of phase change material.

17. The modular collection of claim 14 wherein the thermal insulation is vacuum insulated panels.

18. The modular collection of claim 14 wherein the phase change material is water.

* * * * *